US012560899B2

(12) United States Patent
Li

(10) Patent No.: US 12,560,899 B2
(45) Date of Patent: Feb. 24, 2026

(54) INTERACTIVE CONTROL METHOD, APPARATUS AND SYSTEM FOR INTELLIGENT KITCHEN, STORAGE MEDIUM, AND DEVICE

(71) Applicant: BEIJING JINGDONG ZHENSHI INFORMATION TECHNOLOGY CO., LTD., Beijing (CN)

(72) Inventor: Changling Li, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 666 days.

(21) Appl. No.: 17/759,623

(22) PCT Filed: Dec. 31, 2020

(86) PCT No.: PCT/CN2020/142100
§ 371 (c)(1),
(2) Date: Jul. 28, 2022

(87) PCT Pub. No.: WO2021/169592
PCT Pub. Date: Sep. 2, 2021

(65) Prior Publication Data
US 2023/0046223 A1     Feb. 16, 2023

(30) Foreign Application Priority Data
Feb. 26, 2020     (CN) .......................... 202010118896.9

(51) Int. Cl.
*G05B 19/04*          (2006.01)
*A47J 36/32*          (2006.01)

(52) U.S. Cl.
CPC ............ *G05B 19/04* (2013.01); *A47J 36/321* (2018.08); *G05B 2219/2643* (2013.01)

(58) Field of Classification Search
CPC ............ G05B 19/04; G05B 2219/2643; G05B 19/042; G05B 15/02; G05B 19/418;
(Continued)

(56) References Cited

U.S. PATENT DOCUMENTS

2011/0049796 A1* 3/2011 Nireki .................... B65H 29/46
271/147
2016/0174748 A1   6/2016 Baldwin et al.
(Continued)

FOREIGN PATENT DOCUMENTS

CN           102222160      * 10/2011
CN           102222160 A    10/2011
(Continued)

OTHER PUBLICATIONS

NPL_Clark—AramcoWorld "Chef 2.0" by Brian E. Clark Published Sep. 1, 2019. (Year: 2019).*
(Continued)

*Primary Examiner* — Florian M Zeender
*Assistant Examiner* — Kimberly S. Bursum
(74) *Attorney, Agent, or Firm* — Qinghong Xu

(57) ABSTRACT

An interactive control method, an apparatus, and a system for an intelligent kitchen, a computer readable storage medium, and an electronic device, capable of improving the degree of intelligence of kitchen work, and improving the kitchen operation efficiency. The method includes: obtaining dish information of a dish to be cooked, and determining a cooking task according to the dish information; controlling, according to the cooking task, a target cooking station to cook the dish; determining a dish container corresponding to the dish information according to the dish information, and controlling the dish container to be transported to a dish receiving position of the target cooking station; and after the target cooking station finishes cooking and fills a cooked
(Continued)

dish into the dish container, sending a delivery instruction to control a delivery terminal to perform a dish delivery task.

17 Claims, 12 Drawing Sheets

(58) Field of Classification Search
CPC  G05B 2219/2642; A47J 36/321; Y02P 90/02; G06Q 30/0635; G06Q 50/10
See application file for complete search history.

(56) References Cited

U.S. PATENT DOCUMENTS

| | | | |
|---|---|---|---|
| 2019/0059641 A1 | 2/2019 | Minard et al. | |
| 2022/0118618 A1* | 4/2022 | Oleynik | B25J 13/089 |
| 2022/0142398 A1* | 5/2022 | Fujita | A61B 5/165 |

FOREIGN PATENT DOCUMENTS

| | | | |
|---|---|---|---|
| CN | 102467613 | A | 5/2012 |
| CN | 102622512 | A | 8/2012 |
| CN | 104881929 | A | 9/2015 |
| CN | 105785775 | A | 7/2016 |
| CN | 105844308 | A | 8/2016 |
| CN | 106372797 | A | 2/2017 |
| CN | 107249403 | A | 10/2017 |
| CN | 107818527 | A | 3/2018 |
| CN | 207699132 | U | 8/2018 |
| CN | 109164714 | A | 1/2019 |
| CN | 109493254 | A | 3/2019 |
| CN | 109581896 | A | 4/2019 |
| CN | 109934383 | A | 6/2019 |
| CN | 110136029 | A | 8/2019 |
| CN | 110488625 | A | 11/2019 |
| CN | 110531645 | A | 12/2019 |
| CN | 110579972 | A | 12/2019 |
| CN | 209879572 | U | 12/2019 |
| CN | 111338222 | A | 6/2020 |
| JP | H01281568 | A | 11/1989 |
| JP | H04156698 | A | 5/1992 |
| JP | 2001340201 | A | 12/2001 |
| JP | 2002259530 | A | 9/2002 |
| JP | 2003271713 | A | 9/2003 |
| JP | 2004283983 | A | 10/2004 |
| JP | 2006018459 | A | 1/2006 |
| JP | 2006228123 | A | 8/2006 |
| JP | 2006277118 | A | 10/2006 |
| JP | 2013542403 | A | 11/2013 |
| JP | 2014199542 | A | 10/2014 |
| JP | 2016118985 | A | 6/2016 |
| JP | 2017109774 | A | 6/2017 |
| JP | 2018169711 | A | 11/2018 |
| KR | 20170036546 | A | 4/2017 |

OTHER PUBLICATIONS

NPL_Moley—Gearbrain "This Robotic Kitchen is the ultimate smart home gadget but you can't afford it" by Alistair Charlton Published Dec. 5, 2020. (Year: 2020).*

Decision of Rejection dated Nov. 14, 2023 for Chinese Application No. 2022-525887.

1st Office Action dated May 30, 2023 of Japanese Application No. 2022-525887.

International Search Report dated Mar. 30, 2021 for PCT International Application No. PCT/CN2020/142100.

The First Office Action dated Sep. 7, 2020 for Chinese Patent No. 202010118896.9.

The Second Office Action dated Dec. 9, 2020 for Chinese Patent No. 202010118896.9.

1st Office Action dated Sep. 10, 2024 of Korean Application No. 10-2022-7014906.

Notice of Allowance dated Jan. 14, 2025 of Korean Application No. 10-2022-7014906.

\* cited by examiner

Switching to manual cooking

Dish information: AAA

Table x ( Enter )

1000

Interactive control apparatus
for an intelligent kitchen

Task determination module                1001

Task execution module                    1003

Container transport module               1005

Instruction sending module               1007

INTERACTIVE CONTROL METHOD, APPARATUS AND SYSTEM FOR INTELLIGENT KITCHEN, STORAGE MEDIUM, AND DEVICE

CROSS REFERENCE

The present disclosure is a U.S. national phase application of International Application No. PCT/CN2020/142100 filed on Dec. 31, 2020, which claims priority to Chinese Patent Application No. 202010118896.9, filed on Feb. 26, 2020 and entitled "INTERACTIVE CONTROL METHOD, APPARATUS AND SYSTEM FOR INTELLIGENT KITCHEN, STORAGE MEDIUM, AND DEVICE", which is incorporated herein by reference in its entity.

TECHNICAL FIELD

The present disclosure relates to the technical field of an intelligent kitchen, and in particular, to an interactive control method for an intelligent kitchen, an interactive control apparatus for an intelligent kitchen, an interactive control system for an intelligent kitchen, a computer-readable storage medium, and an electronic device.

BACKGROUND

With the reduction of costs of automated manufacturing and the gradual increase of labor costs, various intelligent kitchen utensils have been introduced into the catering industry, such as automatic stir-frying machines, automatic porridge pots, etc.

For example, when a kitchen worker receives a list of dishes to be cooked, the kitchen worker first prepares various side dishes and condiments needed according to the list of dishes, then uses the automatic stir-frying machine to cook the dishes, and fills cooked dishes into the plates, so that the dishes are brought onto the table. However, in addition to the tasks related to cooking dishes, such as storing and acquiring of various side dishes, selecting of dinner plates, cleaning of the automatic stir-frying machine, etc., which are needed to be completed in the kitchen, the kitchen worker also needs to participate in other tasks in the kitchen. Such situation will result in low operational efficiency of the kitchen and low intelligence of the kitchen work.

It should be noted that the information disclosed in above section is only for enhancement of understanding of the background of the present disclosure, and thus may contain information that does not form the prior art already known to those of ordinary skill in the art.

SUMMARY

The purpose of the present disclosure is to provide an interactive control method for an intelligent kitchen, an interactive control apparatus for an intelligent kitchen, an interactive control system for an intelligent kitchen, a computer-readable storage medium, and an electronic device.

According to one aspect of the present disclosure, an interactive control method for an intelligent kitchen is provided, which includes: obtaining dish information of a to-be-cooked dish, and determining a cooking task according to the dish information; controlling, according to the cooking task, a target cooking station to cook the to-be-cooked dish; determining, according to the dish information, a dish container corresponding to the dish information, and controlling the dish container to be transported to a dish receiving position of the target cooking station; and sending a delivery instruction after the target cooking station finishes cooking and fills a cooked dish into the dish container, to control a delivery terminal to perform a dish delivery task.

According to another aspect of the present disclosure, an interactive control apparatus for an intelligent kitchen, which includes: a task determination module configured to obtain dish information of a to-be-cooked dish, and determining a cooking task according to the dish information; a task execution module configured to control, according to the cooking task, a target cooking station to cook the to-be-cooked dish; a container transport module configured to determine, according to the dish information, a dish container corresponding to the dish information, and control the dish container to be transported to a dish receiving position of the target cooking station; and an instruction sending module configured to send a delivery instruction after the target cooking station finishes cooking and fills a cooked dish into the dish container, to control a delivery terminal to perform a dish delivery task.

In some embodiments, in response to the cooking task including cooking multiple servings of the to-be-cooked dish at the same time, the interactive control apparatus for the intelligent kitchen further includes: a serving determination module configured to determine number of cooking servings of the to-be-cooked dish; and an operation control module configured to in response to number of the dish container for the to-be-cooked dish placed at the dish receiving position of the target cooking station being less than the number of cooking servings, control the target cooking station to perform a first light-on operation, to remind a staff to add the dish container for the to-be-cooked dish.

In some embodiments, the interactive control apparatus for the intelligent kitchen further includes: a number determination module configured to determine number of the dish container corresponding to the dish information contained in the intelligent kitchen; and a number comparison module configured to in response to the number of the dish container corresponding to the dish information being less than a preset container threshold, control the target cooking station to perform an alarm operation, so that a staff adds the dish container corresponding to the dish information.

In some embodiments, in response to the to-be-cooked dish being cooked by the target cooking station, the interactive control apparatus for the intelligent kitchen further includes: a position determination module configured to in response to no dish container for the to-be-cooked dish being placed at the dish receiving position of the target cooking station, control the target cooking station to perform a second light-on operation, to remind a staff to place the dish container for the to-be-cooked dish.

In some embodiments, the intelligent kitchen includes a plurality of cooking stations other than the target cooking station, and the interactive control apparatus for the intelligent kitchen further includes: an information receiving module configured to receive order reminder information for a target dish; a station determination module configured to in response to the target dish being contained in multiple to-be-cooked dishes corresponding to the plurality of cooking stations, determine a cooking station corresponding to the target dish as a cooking station with a delivery priority; and a task reminder module configured to in response to the plurality of cooking stations finishing cooking at the same time, control the cooking station with the delivery priority to perform a third light-on operation, to remind a staff to complete the dish delivery task.

In some embodiments, the interactive control apparatus for the intelligent kitchen further includes: a cooking duration determination module configured to in response to the target dish being not contained in the multiple to-be-cooked dishes corresponding to the plurality of cooking stations, determine waiting duration for cooking the target dish; an order-reminder duration determination module configured to determine order-reminder waiting duration of the target dish based on the order reminder information; and a duration comparison module configured to send manual cooking reminder in response to the waiting duration for cooking the target dish being longer than the order-reminder waiting duration of the target dish, so that the staff cooks the target dish.

In some embodiments, the cooking duration determination module is further configured to obtain remaining cooking durations respectively corresponding to the plurality of cooking stations; and determine shortest cooking duration from the remaining cooking durations as the waiting duration for cooking the target dish.

In some embodiments, before the target cooking station receives the cooking task, the task execution module may be further configured to in response to task modification information for the cooking task being obtained, determine a modified cooking task based on the task modification information; and control, according to the modified cooking task, the target cooking station to cook the to-be-cooked dish.

In some embodiments, the task determination module further includes an order obtaining unit configured to obtain a dish order, and determine the dish information of the to-be-cooked dish based on the dish order.

In some embodiments, the dish container includes a radio frequency identification tag, and after the cooked dish is filled into the dish container, the interactive control apparatus for the intelligent kitchen further includes: an information determination module configured to determine dish delivery information of the cooked dish; an information writing module configured to send the dish delivery information to an information writing end, and control the dish container filled with the cooked dish to be transported to the information writing end, so that the information writing end writes the dish delivery information into the radio frequency identification tag.

According to another aspect of the present disclosure, an interactive control system for an intelligent kitchen is provided, which includes an interactive control apparatus, a target cooking station and a delivery terminal, wherein the interactive control apparatus is configured to obtain dish information of a to-be-cooked dish; determine a cooking task according to the dish information; control, according to the cooking task, the target cooking station to cook the to-be-cooked dish; determine, according to the dish information, a dish container corresponding to the dish information; control the dish container to be transported to a dish receiving position of the target cooking station; and send a delivery instruction after the target cooking station finishes cooking and fills a cooked dish into the dish container, to control the delivery terminal to perform a dish delivery task; the target cooking station is configured to perform cooking of the to-be-cooked dish; and the delivery terminal is configured to perform the dish delivery task based on the delivery instruction.

In some embodiments, the interactive control system for the intelligent kitchen further includes a user terminal configured to send a dish order to the interactive control apparatus, wherein the dish order includes the dish information of the to-be-cooked dish.

According to another aspect of the present disclosure, there is provided a computer-readable storage medium having a computer program stored thereon, which when executed by a processor, the interactive control method for the intelligent kitchen mentioned above is implemented.

According to another aspect of the present disclosure, there is provided an electronic device, which includes one or more processors; and a storage device configured to store one or more programs, which when executed by the one or more processors, cause the one or more processors to implement the interactive control method for the intelligent kitchen mentioned above.

Exemplary embodiments of the present disclosure have the following beneficial effects.

According to the technical solutions provided by some embodiments of the present disclosure, first, dish information of a to-be-cooked dish is obtained, and a cooking task according to the dish information is determined; then, according to the cooking task, a target cooking station is controlled to cook the to-be-cooked dish; next, according to the dish information, a dish container corresponding to the dish information is determined, and the dish container is controlled to be transported to a dish receiving position of the target cooking station; next, a delivery instruction is sent after the target cooking station finishes cooking and a cooked dish is filled into the dish container, to control a delivery terminal to perform a dish delivery task. In one aspect, in the whole process from the dish information of the to-be-cooked dish to the delivery of the cooked dish, the server determines the cooking task, controls the target cooking station to cook the dish, and controls the delivery terminal to deliver the cooked dish, which avoids participation of the staff in the whole process, improves the intelligence level of the kitchen, and reduces the labor costs for kitchen operations. In another aspect of the present disclosure, the dish container corresponding to the dish information can be determined according to the dish information, and control the dish container to be transported to the dish receiving position of the target cooking station. Such process can determine the dish container needed for holding the cooked dish, preventing the staff from choosing a wrong dish container and repeatedly obtaining the dish container, which reduces the error rate in the kitchen work and improves the operational efficiency of kitchen work.

It is to be understood that both the foregoing general description and the following detailed description are exemplary and explanatory only and are not restrictive of the present disclosure.

BRIEF DESCRIPTION OF THE DRAWINGS

The drawings, which are incorporated in and constitute a part of the specification, illustrate embodiments consistent with the present disclosure and together with the specification serve to explain the principles of the disclosure. Obviously, the drawings in the following descriptions are only some embodiments of the present disclosure, and for those of ordinary skill in the art, other drawings can also be obtained from these drawings without creative efforts. In which.

DETAILED DESCRIPTION

Figure 1:
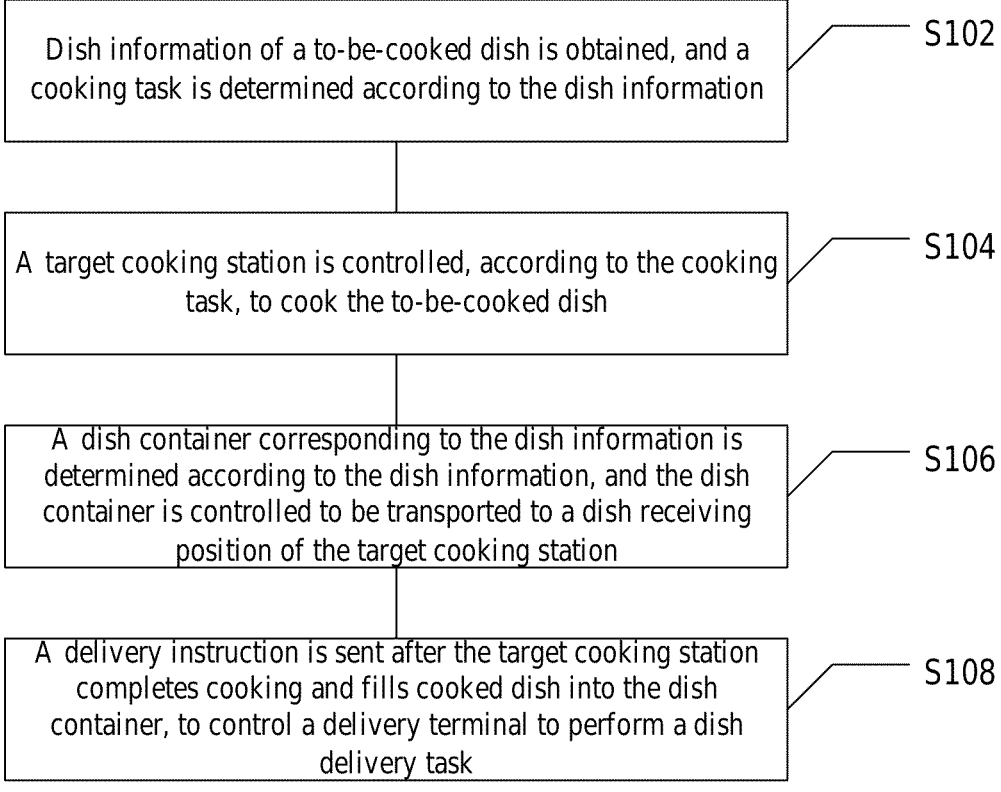
FIG. 1 schematically shows a flowchart of an interactive control method for an intelligent kitchen according to an exemplary embodiment of the present disclosure.

Example embodiments will now be described more fully with reference to the drawings. Example embodiments, however, can be embodied in various forms and should not be construed as limited to the examples set forth herein. Instead, these embodiments are provided so that the present disclosure will be thorough and complete, and will fully convey the concept of example embodiments to those skilled in the art. The described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, devices, steps, etc., may be employed. In other instances, well-known solutions have not been shown or described in detail to avoid obscuring aspects of the present disclosure.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities, which do not necessarily correspond to physically or logically separate entities. These functional entities may be implemented in software, or in one or more hardware modules or integrated circuits, or in different networks and/or processor devices and/or microcontroller devices.

It should be noted that, in the present disclosure, the terms "comprising" and "including" are used to express an open-ended inclusive meaning, and mean that there may be additional elements/components/etc., in addition to the listed elements/components/etc. In addition, the terms "first" and "second" used in the present disclosure are only for the purpose of distinguishment, and should not be used as a restriction of the present disclosure.

The flowcharts shown in the figures are merely illustrative and do not necessarily include all steps. For example, some steps can be decomposed, and some steps can be combined or partially combined, thus an actual execution order may be changed according to actual situations.

In recent years, intelligence has gradually entered people's lives, such as an intelligent restaurant. In the intelligent restaurant, a restaurant waiter first uses a terminal device to determine a dish order, and prints the dish order and hands it over to the kitchen worker. Then the kitchen worker prepares various side dishes and condiments required according to the dish order, and uses various intelligent kitchen utensils, such as an automatic stir-frying machine, to cook the dishes. Next, the kitchen worker fills cooked dishes into the plates, and then places the plates at a pick-up window, so that the cooked dishes can be delivered to the table by the restaurant waiter.

However, in the kitchen, processes such as refrigerating of ingredients, storing and acquiring of side dishes, and washing of pots, still require kitchen workers to complete, which will result in low intelligence level and low operational efficiency of the kitchen. Regarding above problem, the present disclosure provides an interactive control method for an intelligent kitchen.

It should be noted that, in the exemplary embodiments of the present disclosure, the interactive control method for the intelligent kitchen described below can generally be implemented by a server. That is, steps of the interactive control method for the intelligent kitchen can be executed by the server, and in such case, an interactive control apparatus for an intelligent kitchen can be configured in the server.

In addition, the interactive control method for the intelligent kitchen can also be implemented by a terminal device (such as mobile phones, tablets, personal computers, etc.). That is, steps of the interactive control method for the intelligent kitchen can be executed by the terminal device, and in such case, an interactive control apparatus for an intelligent kitchen can be configured in the terminal device.

Hereinafter, steps of the interactive control method for the intelligent kitchen according to the exemplary embodiments will be described in more detail with reference to the drawings and embodiments.

FIG. 1 schematically shows a flowchart of an interactive control method for an intelligent kitchen according to an exemplary embodiment of the present disclosure. In the following, a server is used as an execution subject for the exemplary embodiments. Referring to FIG. 1, the interactive control method for the intelligent kitchen may include the following steps.

S102, dish information of a to-be-cooked dish is obtained, and a cooking task is determined according to the dish information.

In the exemplary embodiments of the present disclosure, the dish information may be an identification of the to-be-cooked dish, a name of the to-be-cooked dish, or a serial number of the to-be-cooked dish. For example, if the to-be-cooked dish is sour and spicy shredded potatoes, the dish information may be the identification A of the to-be-cooked dish, or the name, sour and spicy shredded potatoes, of the to-be-cooked dish, or the serial number 001 of the to-be-cooked dish.

The cooking task may include cooking utensils, cooking duration, cooking heat, storage locations and proportions of seasonings, and side dish information required for cooking the to-be-cooked dish. The side dish information may include names of the side dishes, quantities of the side dishes, and storage locations of the side dishes, etc. The cooking utensils may be selected according to different dish information. For example, when the dish information is sour and spicy shredded potatoes, the cooking utensil may be an automatic stir-frying machine, and when the dish information is steamed perch, the cooking utensil may be an intelligent steamer, etc.

The server stores the cooking task of the dish information in the database. That is, each of the dish information stored by the server in the database corresponds to a cooking task. Herein, the cooking task stored in the database may be obtained from the Internet, or may be the cooking task stored in advance by a staff. In the cooking task stored in the database, number of cooking servings which is specified may be one serving.

The server first obtains the dish information of the to-be-cooked dish, and then determines, according to the dish information, the cooking task from the database.

For example, the dish information of the to-be-cooked dish is stir-fried pork with peppers. The cooking task of the stir-fried pork with peppers stored in the server may include the followings: the cooking utensil is an automatic stir-frying machine, the cooking duration is 10 minutes, the cooking heat is medium heat, and the side dish information. Herein, the side dish information may include the peppers located at a first storage location, the pork located at a second storage location, etc. The quantities of the side dishes are 200 grams of peppers and 200 grams of pork.

The server obtains that the dish information of the to-be-cooked dish is stir-fried pork with peppers, and then determines, according to the stir-fried pork with peppers, a cooking task of the stir-fried pork with peppers.

According to the exemplary embodiments of the present disclosure, the server may obtain a dish order, and determine the dish information of the to-be-cooked dish based on the dish order. Herein, the dish order may include the dish information of the to-be-cooked dish, number of cooking servings of the to-be-cooked dish, a delivery location, etc.

It should be noted that the server may also first obtain a first dish order, and the first dish order includes dish information of a to-be-cooked dish A. Then, within a preset time interval, the server obtains a second dish order, and the second dish order includes dish information of the to-be-cooked dish A. Next, the server may combine the first dish order with the second dish order to determine that the to-be-cooked dish A and the number of cooking servings of the to-be-cooked dish.

Figure 2:
FIG. 2 schematically shows a schematic diagram of an ordering interface of a user terminal according to an exemplary embodiment of the present disclosure.
Figure 3:
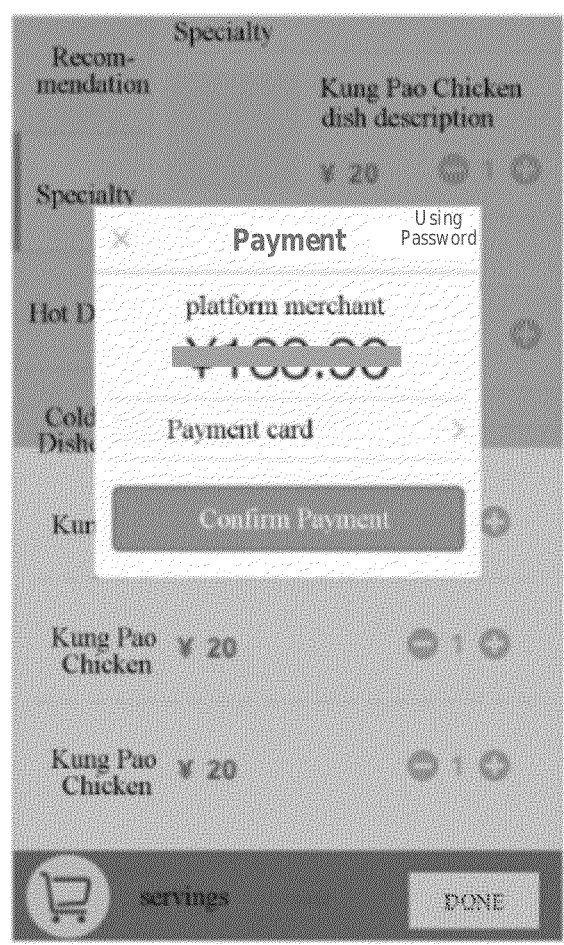
FIG. 3 schematically shows a schematic diagram of an order payment interface of a user terminal according to an exemplary embodiment of the present disclosure.

For example, firstly, a diner issues a selection instruction through a user terminal, by selecting 1 serving of Kung Pao Chicken on an ordering interface shown in FIG. 2, and then the diner issues a payment instruction through the user terminal, by completing the payment for the order based on an order payment interface shown in FIG. 3. The user terminal feeds back a dish order to the server in response to the selection instruction and the payment instruction. That is, the server receives a dish order. The dish order may include: dish information of the to-be-cooked dish: Kung Pao Chicken, and number of cooking servings: 1 serving.

That is, the server may determine the dish information and the number of cooking servings of the to-be-cooked dish based on the dish order.

S104, a target cooking station is controlled, according to the cooking task, to cook the to-be-cooked dish.

In the exemplary embodiments of the present disclosure, the target cooking station may refer to an operation console that will cook the to-be-cooked dish. The cooking station may include a cooking pan device for cooking the dishes, an acquisition device for acquiring the side dishes and the seasonings, a control device for controlling the cooking duration and the cooking heat, etc.

After determining the cooking task according to the dish information, the server may send the cooking task to the target cooking station, and control, according to the cooking task, the target cooking station to cook the to-be-cooked dish.

In addition, the cooking station can feed back an operation state of the cooking station to the server, so that the server can control the cooking station to cook. The operation state of the cooking station may include an in-cooking state, a not-cooking state, etc.

For example, a cooking task of stir-fried pork with peppers includes the followings: the cooking utensil is an automatic stir-frying machine, the cooking duration is 10 minutes, the cooking heat is medium heat, and the side dish information. The side dish information may include the peppers located at a first storage location, the pork located at a second storage location, etc., and the quantities of the side dishes are 200 grams of peppers and 200 grams of pork. The number of cooking servings specified in the cooking task is one serving. It should be noted that the cooking station A in the intelligent kitchen may be an automatic stir-frying machine.

The server first obtains that the dish information of the to-be-cooked dish is stir-fried pork with peppers, and then determines the cooking task according to the stir-fried pork with peppers. The cooking task may specifically include the followings: cooking utensil for the stir-fried pork with peppers: automatic stir-frying machine; cooking duration: 10 minutes; cooking heat: medium heat; number of cooking servings: one serving; and the side dish information. The side dish information may include the peppers located at a first storage location, the pork located at a second storage location, etc., and the quantities of the side dishes are 200 grams of peppers and 200 grams of pork. Next, the server determines the cooking station A as the target cooking station, sends the cooking task of stir-fried pork with peppers to the cooking station A, and then controls, according to the cooking task, the cooking station A to cook the stir-fried pork with peppers.

According to the exemplary embodiments of the present disclosure, before the cooking task is received by the target cooking station, if the server can obtain task modification information for the cooking task, the server will determine modified cooking task based on the task modification information, and control, according to the modified cooking task, the target cooking station to cook the to-be-cooked dish.

The task modification information may include modification information for the cooking duration of the to-be-cooked dish, modification information for the proportions of seasonings required for cooking, modification information for the side dishes, modification information for the number of cooking servings, etc.

The server may also determine the modified cooking task based on the task modification information after the cooking task is received by the target cooking station and before the target cooking station starts cooking the to-be-cooked dish.

For example, the server receives a dish order, and determines, based on the dish order, that the dish information of the to-be-cooked dish is sour and spicy shredded potatoes. In addition, the cooking task of the sour and spicy shredded potatoes may include 100 grams of dried peppers, 24 grams of vinegar, 3 grams of salt, 3 grams of monosodium glutamate and other seasonings.

Before the cooking task of the sour and spicy shredded potatoes is received by the target cooking station, the server first receives task modification information for the cooking task of the sour and spicy shredded potatoes. The task modification information includes the followings: reducing 20 grams of dry peppers, increasing 6 grams of vinegar, removing the monosodium glutamate, etc. The server then determines the modified cooking task based on the task modification information. The modified cooking task specifically includes 80 grams of dried peppers, 30 grams of vinegar, 3 grams of salt and other seasonings. Next, the server controls, according to the modified cooking task, the target cooking station to cook the to-be-cooked dish.

S106, a dish container corresponding to the dish information is determined according to the dish information, and the dish container is controlled to be transported to a dish receiving position of the target cooking station.

In the exemplary embodiments of the present disclosure, the dish container may be determined by the server according to different dish information. For example, when the dish information is sour and spicy shredded potatoes, the dish container may be determined as a plate, and when the dish information is poached spicy slices of pork, the dish container may be determined as a large bowl.

The dish receiving position may receive the dish container for the to-be-cooked dish, and may belong to the target cooking station.

The server may store a corresponding relationship between the dish information and the dish container. The corresponding relationship between the dish information and the dish container may be that one or more pieces of dish information corresponds to one type of dish container, or may be that one piece of dish information corresponds to one type of dish container. After the dish information of the to-be-cooked dish is obtained, the server can first determine, according to the corresponding relationship between the dish information and the dish container, the dish container corresponding to the dish information of the to-be-cooked dish, and then control the dish container to be transported to the dish receiving position of the target cooking station.

In the present disclosure, the dish container corresponding to the dish information can be determined according to the dish information, and the dish container can be controlled to be transported to the dish receiving position of the target cooking station. The dish container needed for holding the cooked dish can be determined through above process, so as to prevent the staff from choosing a wrong dish container and repeatedly acquiring of the dish container, which reduces the error rate in the kitchen work and improves the operational efficiency of the kitchen work.

It should be noted that the server can control the dish container to be transported to the dish receiving position of the target cooking station, and the target cooking station can also control the dish container to be transported to its dish receiving position.

For example, the server obtains a dish order, and the dish order may include the dish information of the to-be-cooked dish, i.e., sour and spicy shredded potatoes. In addition, the server has stored the following content: when the dish information is sour and spicy shredded potatoes, the dish container may be a plate; and when the dish information is poached spicy slices of pork, the dish container may be a large bowl. The cooking station is the automatic stir-frying machine A.

The server may first determine, based on the dish order, the dish information of the to-be-cooked dish as sour and spicy shredded potatoes, and then determine, according to the sour and spicy shredded potatoes, the dish container as a plate. Next, the server controls the plate to be transported to the dish receiving position of the automatic stir-frying machine A.

According to the exemplary embodiments of the present disclosure, in a case where the cooking task includes cooking multiple to-be-cooked dishes at the same time, the server may determine the number of cooking servings of the to-be-cooked dish. If the number of the dish containers for the to-be-cooked dish placed at the dish receiving position of the target cooking station is less than the number of cooking servings, the target cooking station is controlled to perform a first light-on operation. Herein, the first light-on operation is used to remind the staff to add dish containers for the to-be-cooked dish.

Herein, the first light-on operation includes turning on a yellow light, and the yellow light is continuously on without blinking, until the number of the dish containers for the to-be-cooked dish placed at the dish receiving position of the target cooking station is equal to the number of cooking servings, then the yellow light is turned off The light may be located at the dish receiving position of the target cooking station, and the light may also be located on an operation surface of the target cooking station. The latter where the light is arranged on the operation surface of the target cooking station is also within the protection scope of the present disclosure.

It should be noted that when the dish containers are transported to the dish receiving position of the target cooking station and the target cooking station has finished cooking, or when the dish containers are transported to the dish receiving position of the target cooking station and the target cooking station is cooking the to-be-cooked dish, in response to the number of the dish containers for the to-be-cooked dish placed at the dish receiving position of the target cooking station being less than the number of cooking servings, the server can control the target cooking station to perform the first light-on operation.

The dish container in the intelligent kitchen may be provided with an RFID (Radio Frequency Identification) tag to store container information of the dish container. The container information includes a name of the dish container, a size of the dish container, etc. The dish receiving position of the target cooking station can be provided with an RFID reader.

After the dish container is transported to the dish receiving position of the target cooking station, the target cooking station first reads the container information from the RFID tag of the dish container through the RFID reader, and then matches the container information of the dish container with the dish information of the to-be-cooked dish. If they are not matched, an error warning for the container will be sent so that the staff can correct the error.

In addition, the server can detect the number of dish containers for the to-be-cooked dish placed at the dish receiving position of the target cooking station. The target cooking station can also detect the number of dish containers for the to-be-cooked dish placed at the dish receiving position of the target cooking station, and feedback it to the server.

In the present disclosure, the target cooking station is controlled to perform the first light-on operation, thus a slow delivery of the cooked dishes caused by insufficient placement of the dish containers at the dish receiving position can be avoided, which reduces the error rate in the kitchen work and improves the accuracy of the kitchen work.

For example, the server obtains a dish order A and a dish order B. Among which, the dish order A includes: dish information of the to-be-cooked dish: sour and spicy shredded potatoes, and number of cooking servings: 1 serving; and the dish order B includes: dish information of the to-be-cooked dish: sour and spicy shredded potatoes, and number of cooking servings: 1 serving.

The server may first determine, based on the dish order A and the dish order B, that the dish information of the to-be-cooked dish is sour and spicy shredded potatoes, and the number of cooking servings is 2 servings. Then the server determines, based on the sour and spicy shredded potatoes, that the dish container is the plate, and the plate is transported to the dish receiving position of the target cooking station. Next, the server detects that the number of dish containers for the to-be-cooked dish placed at the dish receiving position of the target cooking station is 1, which is less than the number of cooking servings 2. Next, the server controls the target cooking station to turn on the yellow light, which is used to remind the staff to add dish containers for the to-be-cooked dish.

According to the exemplary embodiments of the present disclosure, when the to-be-cooked dish is being cooked by the target cooking station, if no dish containers for the to-be-cooked dish is placed at the dish receiving position of the target cooking station, the target cooking station is controlled to perform a second light-on operation. Herein, the second light-on operation is used to remind the staff to place dish containers for the to-be-cooked dish.

Herein, the second light-on operation includes turning on a red light, and is different from the first light-on operation. The second light-on operation may also include turning on the yellow light at a specified blinking frequency.

According to the exemplary embodiments of the present disclosure, the server may determine the number of the dish containers corresponding to the dish information contained in the intelligent kitchen. If the number of the dish containers corresponding to the dish information is less than a preset container threshold, the target cooking station is controlled to perform an alarm operation, so that the staff can add dish containers corresponding to the dish information.

The container threshold may be a threshold of one type of dish container corresponding to one or more pieces of dish information, or may be a threshold of one type of dish container corresponding to one piece of dish information.

The alarm operation may be a voice alarm operation, or an operation in which the target cooking station sends alarm information to the server.

In addition, a storage location of the dish container corresponding to the dish information contained in the intelligent kitchen may be located at the target cooking station, or may be independent of the target cooking station.

In the exemplary embodiments of the present disclosure, the target cooking station is controlled to perform an alarm operation, so as to remind the staff to add the dish container corresponding to the dish information. As a result, a fact that the dish container cannot be transported to the target cooking station in time can be avoided, the operational efficiency of kitchen work can be improved, and the error rate of kitchen work can be reduced.

For example, the thresholds of the dish containers corresponding to different dish information contained in the intelligent kitchen are respectively: small plate 50, large plate (for fish) 20, medium plate 30, and large bowl 20. The dish container corresponding to the dish information, steamed perch, is the large plate (for fish).

The server determines that the intelligent kitchen includes 10 large plates (for fish) corresponding to the steamed perch, which is less than the container threshold of 20, and controls the target cooking station to send information to the server that the number of the large plates (for fish) included in the intelligent kitchen is insufficient.

S108, a delivery instruction is sent after the target cooking station completes cooking and fills cooked dish into the dish container, to control a delivery terminal to perform a dish delivery task.

In an exemplary embodiment of the present disclosure, the delivery instruction may include the dish information of the cooked dish, a delivery address identification, etc.

The server may also control the target cooking station to perform a dish-filling reminder operation when the target cooking station has finished cooking and has not filled the cooked dish into the dish container, so that the staff can complete filling of the cooked dish.

According to an exemplary embodiment of the present disclosure, the dish container may include an RFID (Radio Frequency Identification) tag. After the cooked dish has been filled into the dish container, the server may first determine the dish delivery information of the cooked dish, and then send the dish delivery information to an information writing end, and control the dish container filled with the cooked dish to be transported to the information writing end, so that the information writing end can write the dish delivery information into the RFID tag.

Herein, the dish delivery information may include the dish information of the cooked dish, a delivery address identification corresponding to the cooked dish, etc. The information writing end may be, for example, an RFID writing station.

A delivery terminal can also be equipped with an RFID reader. After the dish container has been placed on the delivery terminal, the delivery terminal may first read the dish delivery information in the RFID tag of the dish container, and then the delivery terminal compares the dish delivery information of the cooked dish with the dish delivery information contained in the delivery instruction sent by the server. Next, if a comparison result is the same, the delivery terminal may deliver the dish container filled with the cooked dish according to the delivery address identification corresponding to the cooked dish.

In addition, the information writing end may be arranged at the dish receiving position of the target cooking station in advance. After the cooked dish is filled into the dish container, the server may control the information writing end of the target cooking station to write information to the dish container filled with the cooked dish.

For example, after the target cooking station has finished cooking a serving of shredded potatoes and has filled it into a small plate, the server reminds the staff to write information into the small plate.

The server first sends the dish information of the cooked dish, namely the shredded potatoes, and a dining address, namely table No. 1, to the RFID writing station, and then controls the small plate filled with the shredded potatoes to be transported to the RFID writing station. Next, the RFID writing station writes the dish information of the cooked dish, namely the shredded potatoes, and the dining address, namely table No. 1, into the small plate. Next, the server sends a delivery instruction to a delivery trolley No. 2. After the delivery trolley No. 2 reads the dish information of the cooked dish, namely the shredded potatoes and the dining address, namely table No. 1, it completes the dish delivery task.

In the present disclosure, in the whole process from the dish information of the to-be-cooked dish to the delivery of the cooked dish, the server determines the cooking task, controls the target cooking station to cook the dish, and controls the delivery terminal to deliver the cooked dish, which avoids participation of the staff in the whole process, improves the intelligence level of the kitchen, and reduces the labor costs for kitchen operations.

According to an exemplary embodiment of the present disclosure, the intelligent kitchen includes a plurality of cooking stations in addition to the target cooking station, and the user terminal can send order reminder information to the server. That is, the server can receive the order reminder information for a target dish.

Figure 4:
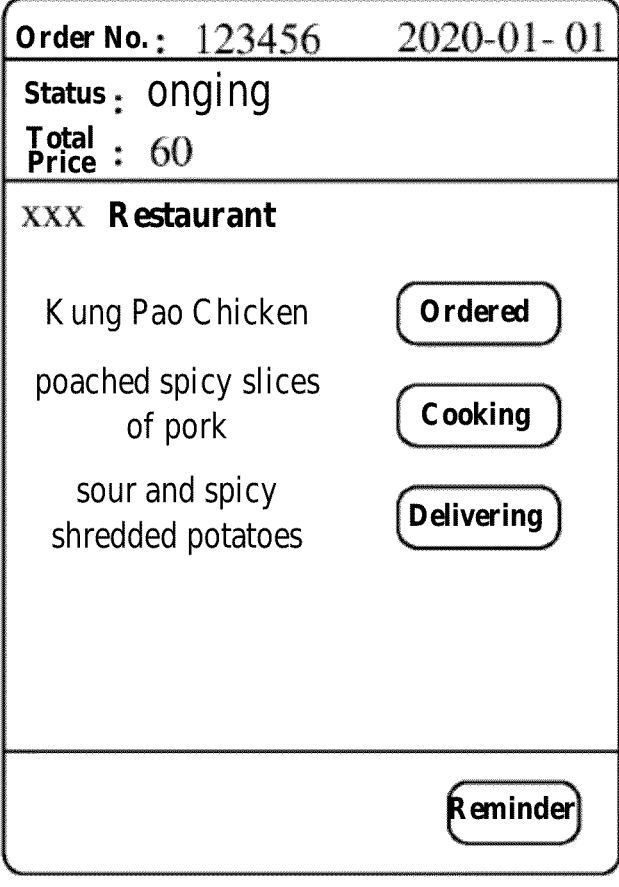
FIG. 4 schematically shows a schematic diagram of a dish order interface of a user terminal according to an exemplary embodiment of the present disclosure.

Referring to FIG. 4, the dish order interface of the user terminal can display the dish information that the diners have ordered, a dish state corresponding to the dish information, and an order reminder button. The dish state may include order-placed state, in-cooking state, in-delivery state, and delivered state.

The user terminal first responds to an order reminder instruction from the diners, and then determines, in the order reminder information, the dish information, whose dish state is the order-placed and in-cooking, as a target dish. Next, the order reminder information is sent to the server, and order information that the order has been reminded is displayed on the user terminal.

The server may receive the order reminder information for a target dish. if the target dish is included in multiple to-be-cooked dishes corresponding to the plurality of cooking stations, the cooking station corresponding to the target dish will be determined as the cooking station with a delivery priority. In a case where the plurality of cooking stations finish cooking at the same time, control the cooking station with the delivery priority to perform a third light-on operation. Herein, the third light-on operation is used to remind the staff to complete the dish delivery task.

The target dish is the dish corresponding to the dish information that the server needs to query. The order reminder information may include the dish information of the target dish, the delivery address identification of the dish, and order-reminder waiting duration of the target dish, etc. Herein, the order-reminder waiting duration may be how long the target dish can be waited after the server receives the order reminder information of the target dish.

The third light-on operation includes turning on a green light, which may indicate that the cooking station with the delivery priority has finished the cooking task. The delivery priority may mean that a target dish is delivered before other cooked dishes when the plurality of cooking stations finish cooking multiple to-be-cooked dishes at the same time.

If the multiple to-be-cooked dishes corresponding to the plurality of cooking stations do not include the target dish, the waiting duration for cooking the target dish is determined. The order-reminder waiting duration of the target dish is determined based on the order reminder information. In a case where the waiting duration for cooking the target dish is longer than the order-reminder waiting duration of the target dish, a manual cooking reminder is sent so that the target dish can be cooked by the staff.

The waiting duration for cooking the target dish may be the duration the target dish needs to wait, before the server may control the cooking station to cook the target dish. According to an exemplary embodiment of the present disclosure, the server may first obtain remaining cooking durations respectively corresponding to the plurality of cooking stations. Then, the server determines from the remaining cooking durations, the shortest cooking duration as the waiting duration for cooking the target dish. Herein, the remaining cooking duration may refer to the duration the cooking station still needs to complete the ongoing cooking task.

The manual cooking reminder may be a voice reminder for manual cooking or a text reminder for manual cooking.

Figures 5, 6:
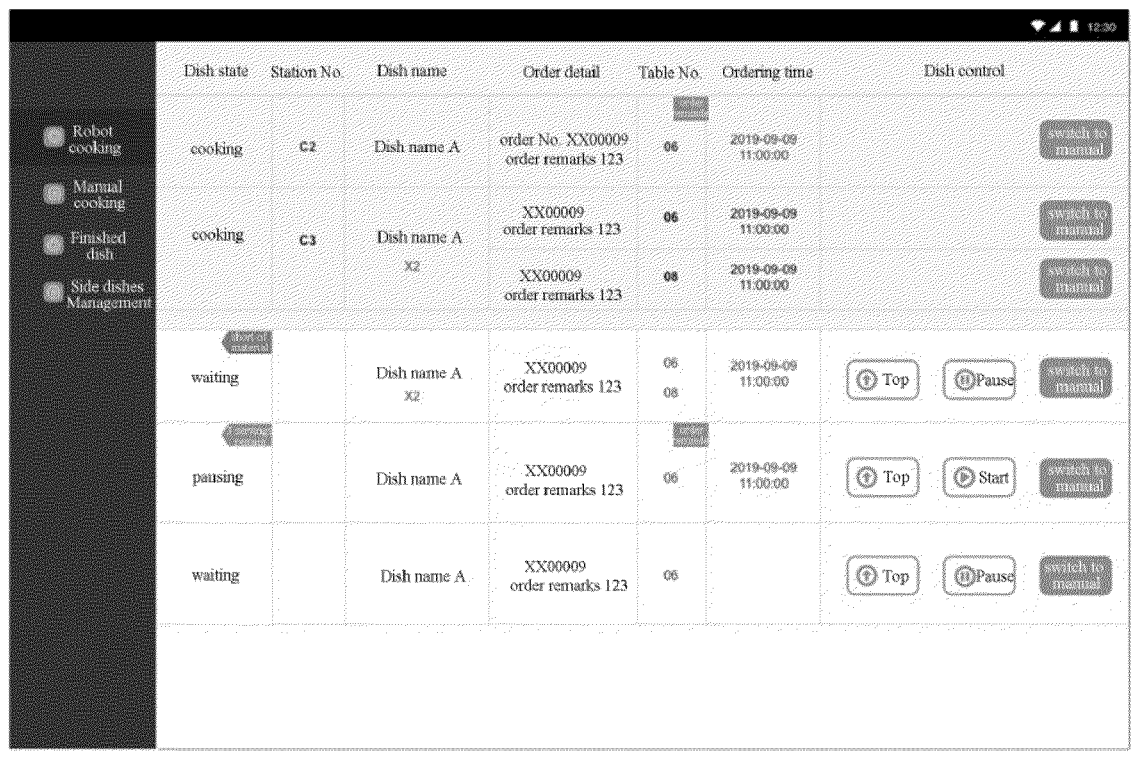
FIG. 5 schematically shows a schematic diagram of a dish process management interface according to an exemplary embodiment of the present disclosure.
FIG. 6 schematically shows a schematic diagram of an information confirmation interface for switching to manual cooking according to an exemplary embodiment of the present disclosure.

In addition, after the server sends the manual cooking reminder, the staff selects a manual switch button based on a dish process management interface as shown in FIG. 5, and a kitchen management terminal first responds to such a selection instruction, and then pops up an information confirmation interface for switching to manual cooking as shown in FIG. 6, which enables the staff to confirm the information of the to-be-cooked dish being switched to manual cooking. Next, the kitchen management terminal feeds back a result to the server that the dish has been switched to manual cooking. Herein, the dish process management interface may include the dish information and the order information of the dishes, the manual switch button, etc.

It should be noted that, in the case where the plurality of cooking stations finish cooking at the same time and the server has not received the order reminder information of the target dish, the server can determine a delivery order according to obtained chronological order of the dish information of the multiple to-be-cooked dishes corresponding to the plurality of cooking stations.

For example, the intelligent kitchen includes 4 cooking stations, each of which is performing a cooking task. Among which, a cooking station A is cooking sour and spicy shredded potatoes, a cooking station B is cooking stir-fried pork with peppers, a cooking station C is cooking Kung Pao Chicken, and a cooking station D is cooking poached spicy slices of pork.

Figure 7:
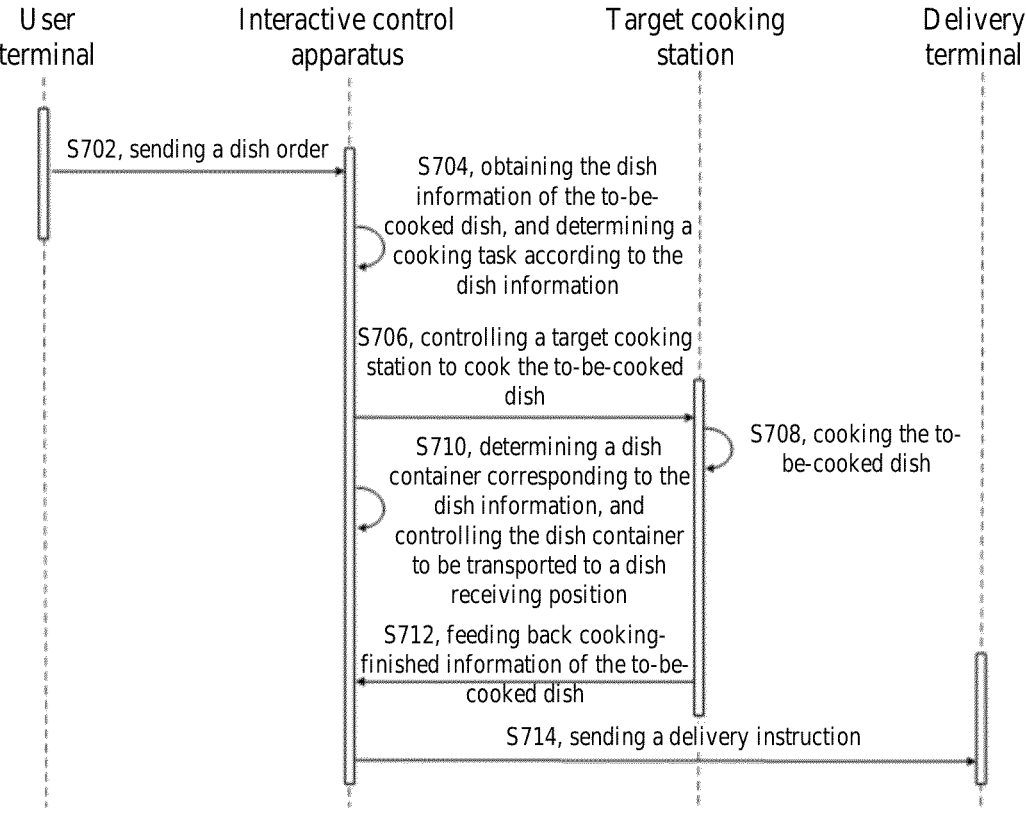
FIG. 7 schematically shows an interaction process of an interactive control method for an intelligent kitchen according to an exemplary embodiment of the present disclosure.

The server receives an order reminder information of a target dish, and the order reminder information includes the followings: the dish information of the target dish is shredded cabbage, and the order-reminder waiting duration is 4 minutes. The server first compares the dish information of the target dish with the dish information of the 4 to-be-cooked dishes corresponding to the 4 cooking stations in the intelligent kitchen, and learns that among the 4 to-be-cooked dishes corresponding to the 4 cooking stations, the target dish is not included. Then, the server determines the remaining cooking durations of the 4 cooking stations, which are, the remaining cooking duration of cooking station A is 5 minutes, the remaining cooking duration of cooking station B is 7 minutes, the remaining cooking duration of cooking station C is 6 minutes, and the remaining cooking duration of cooking station D is 10 minutes. Then, the server determiners from the 4 remaining cooking durations the shortest cooking duration is 5 minutes, which is used as the waiting duration for cooking the target dish. Then, the server compares the waiting duration for cooking the target dish with the order-reminder waiting duration, and learns that the waiting duration for cooking the target dish is longer than the order-reminder waiting duration. Next, the server sends a voice reminder for manual cooking so that the target dish can be cooked by the staff FIG. 7 schematically shows an interaction process of an interaction control method for an intelligent kitchen according to an exemplary embodiment of the present disclosure. Specifically, the following steps may be included.

In step S702, a user terminal sends a dish order, wherein the dish order may include dish information of to-be-cooked dish. In step S704, an interactive control apparatus may obtain the dish information of the to-be-cooked dish based on the dish order, and determine a cooking task according to the dish information. In step S706, the interactive control apparatus may control, according to the cooking task, a target cooking station to cook the to-be-cooked dish. In step S708, the target cooking station cooks the to-be-cooked dish. In step S710, the interactive control apparatus determines, according to the dish information, a dish container corresponding to the dish information, and controls the dish container to be transported to a dish receiving position of the target cooking station. In step S712, the target cooking station may feed back cooking-finished information of the to-be-cooked dish. In step S714, after the target cooking station finishes cooking and fills cooked dish into the dish container, the interactive control apparatus may send a delivery instruction to a delivery terminal to control the delivery terminal to perform a dish delivery task.

The cooking tasks corresponding to different dish information stored in the interactive control apparatus can be obtained from the Internet and can be set by the staff. After the dish information of the to-be-cooked dish is obtained, the cooking task is determined according to the dish information.

Figure 8:
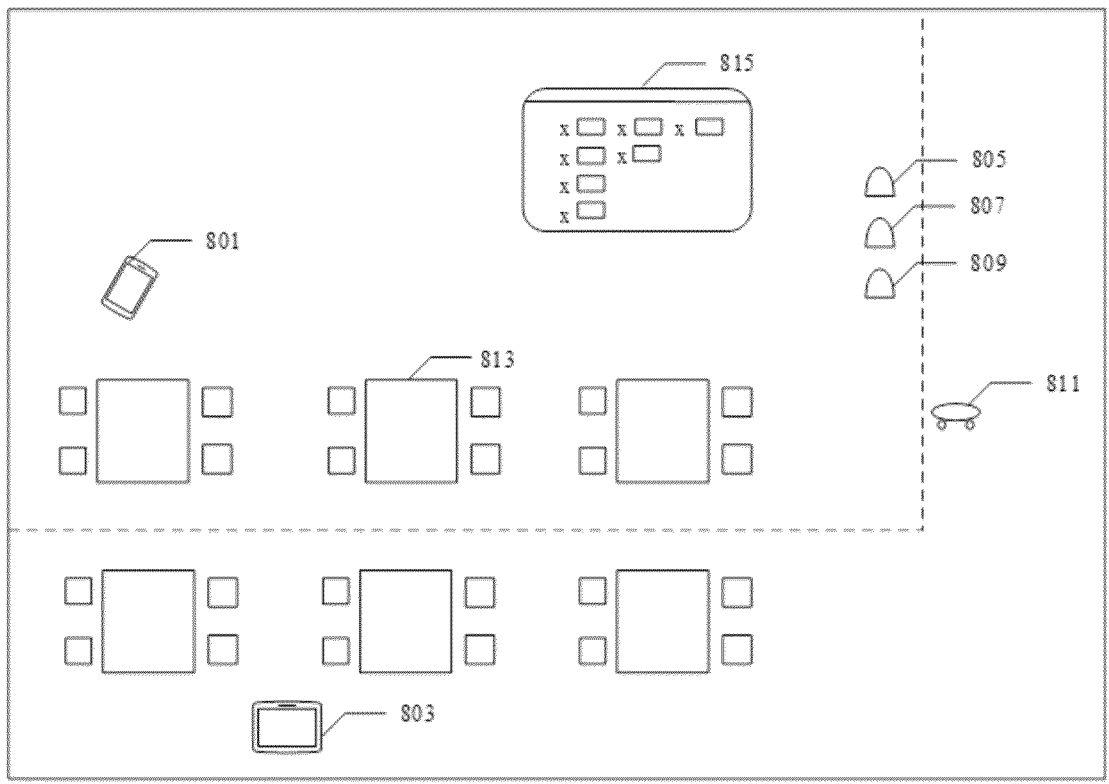
FIG. 8 schematically shows a schematic diagram of an interactive terminal in an intelligent restaurant according to an exemplary embodiment of the present disclosure.

Referring to FIG. 8, an intelligent restaurant is taken as an example, a user terminal 801 sends a dish order A to the interactive control apparatus in response to an ordering instruction from a diner 1, and a user terminal 803 sends a dish order B to the interactive control apparatus in response to an ordering instruction from a diner 2. The interactive control apparatus obtains the dish order A and the dish order B. Among which, the dish order A includes: dish information of the to-be-cooked dish: sour and spicy shredded potatoes, and number of cooking servings: 1 serving; and the dish order B includes: dish information of the to-be-cooked dish: sour and spicy shredded potatoes, and number of cooking servings: 1 serving. After combining the dish orders A and B, the interactive control apparatus determines that the dish information of the to-be-cooked dish is sour and spicy shredded potatoes, and the number of cooking servings is 2 servings.

It should be noted that the interactive control apparatus can store the cooking task corresponding to the dish information, and a correspondence relationship between the dish information and the dish container. The cooking task for sour and spicy shredded potatoes includes the followings: cooking utensils: automatic stir-frying machine; side dishes: 300 grams of potatoes; seasonings: 100 grams of dried peppers, 24 grams of vinegar, 3 grams of salt, 3 grams of monosodium glutamate and other seasonings. The dish container for sour and spicy shredded potatoes may be a plate, the dish container for Kung Pao Chicken may be a plate, and the dish container for poached spicy slices of pork may be a large bowl.

The intelligent kitchen includes a first cooking station 805, a second cooking station 807 and a third cooking station 809. Among which, the first cooking station 805 is an automatic stir-frying machine A, the second cooking station 807 is an automatic stir-frying machine B, and the third cooking station 809 is an automatic steaming machine C. A container threshold for the plate in the intelligent kitchen is 20, and a container threshold for the large bowl is 15.

The interactive control apparatus first obtains the dish information of the to-be-cooked dish, namely sour and spicy shredded potatoes, and the number of cooking servings, namely 2 servings.

The interactive control apparatus may then determine the cooking task according to the sour and spicy shredded potatoes. Before the cooking station receives the cooking task of the sour and spicy shredded potatoes, the interactive control apparatus may receive task modification information for the cooking task of the sour and spicy shredded potatoes. The task modification information includes the followings: reducing 20 grams of dry peppers, increasing 6 grams of vinegar, removing the monosodium glutamate, etc. The interactive control apparatus then may determine a modified cooking task based on the task modification information. The modified cooking task specifically includes 80 grams of dried peppers, 30 grams of vinegar, 3 grams of salt and other seasonings.

Next, the interactive control apparatus controls, according to the modified cooking task, the target cooking station to cook the to-be-cooked dish. Herein, the target cooking station is determined to be the automatic stir-frying machine A.

Next, the interactive control apparatus may determine the dish container, namely plate, according to the sour and spicy shredded potatoes, and control the plate to be transported to the dish receiving position of the automatic stir-frying machine A.

Next, the interactive control apparatus may detect that the number of dish containers for the to-be-cooked dish placed at the dish receiving position of the automatic stir-frying machine A is 1, which is less than the number of cooking servings of 2. The interactive control apparatus controls the target cooking station to turn on a yellow light, to remind the staff to add the dish container (plate) for the to-be-cooked dish.

Next, after the automatic stir-frying machine A finishes cooking and fills the cooked dishes into the plates, the interactive control apparatus may send a delivery instruction to control a delivery terminal 811 to perform a dish delivery task. The dish delivery task includes specifically that the delivery terminal 811 delivers the cooked dishes to a dining table 813.

In addition, the interactive control apparatus determines that the number of large bowls in the intelligent kitchen is 10, and controls the target cooking station to send to the interactive control apparatus a message indicating insufficient number of dish containers (large bowls) in the intelligent kitchen, so that the staff can increase the number of the large bowls.

When the automatic stir-frying machine A finishes its cooking task, and the second cooking station finishes its cooking task at the same time, the interactive control apparatus receives order reminder information for the target dish whose dish information is the Kung Pao Chicken.

According to feedbacks from the cooking stations, the to-be-cooked dish whose dish information is Kung Pao Chicken is being cooked by the second cooking station, and the to-be-cooked dish whose dish information is shredded cabbages is being cooked by the third cooking station. The interactive control apparatus determines that 3 to-be-cooked dishes on the 3 cooking stations include the target dish, and determines the second cooking station as the cooking station with a delivery priority. The interactive control apparatus controls the second cooking station to turn on a green light, to remind the staff to complete the dish delivery task.

It should be noted that the kitchen management terminal 815 can respond to an instruction operation for switching to manual cooking from the staff, and the kitchen management terminal can feed back a result to the interactive control apparatus that the dish has been switched to manual cooking. The kitchen management terminal 815 can also receive information related to the dish order sent by the user terminal, and can display information related to the dish information stored by the interactive control apparatus.

It should be noted that although various steps of the methods of the present disclosure are depicted in the drawings in a particular order, this does not require or imply that the steps must be executed in that particular order, or that all illustrated steps must be executed to achieve a desired result. Additionally or alternatively, some steps may be omitted, multiple steps may be combined into one step for execution, and/or one step may be decomposed into multiple steps for execution, and the like.

Further, in an exemplary embodiment of the present disclosure, an interactive control system for an intelligent kitchen is also provided.

Figure 9:
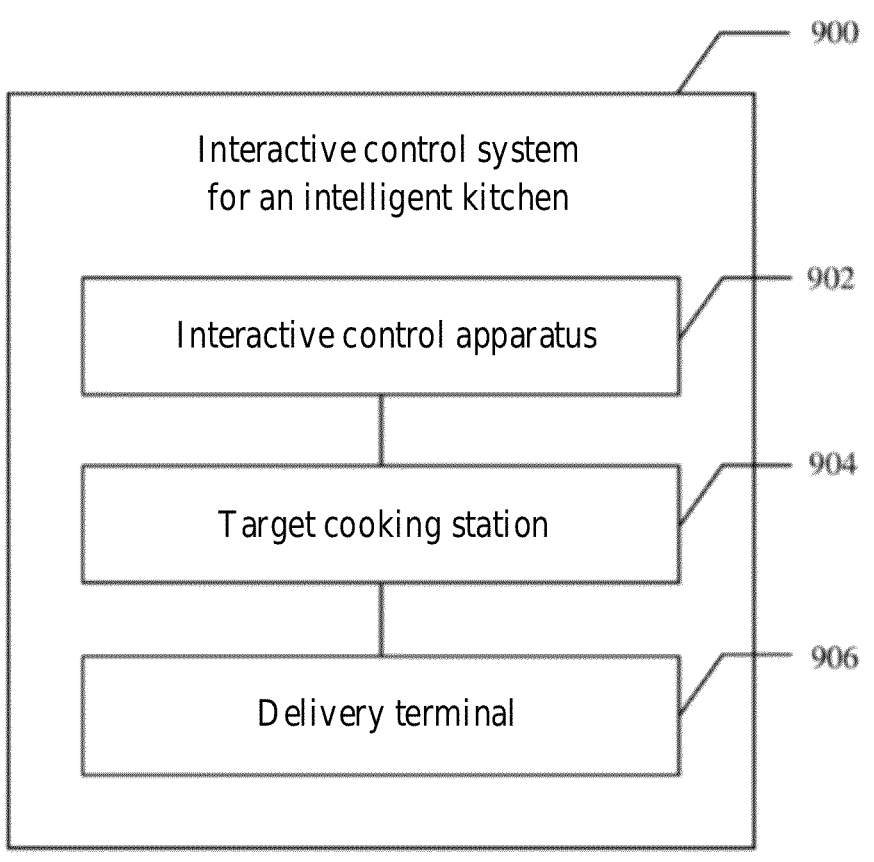
FIG. 9 schematically shows a block diagram of an interactive control system for an intelligent kitchen according to an exemplary embodiment of the present disclosure.

FIG. 9 schematically shows a block diagram of an interactive control system for an intelligent kitchen according to an exemplary embodiment of the present disclosure. Referring to FIG. 9, an interactive control system 900 for an intelligent kitchen according to an exemplary embodiment of the present disclosure may include an interactive control apparatus 902, a target cooking station 904 and a delivery terminal 906.

Among which, the interactive control apparatus 902 is configured for obtaining dish information of a to-be-cooked dish, and determining a cooking task according to the dish information; controlling, according to the cooking task, the target cooking station 904 to cook the to-be-cooked dish; determining, according to the dish information, a dish container corresponding to the dish information; controlling the dish container to be transported to a dish receiving position of the target cooking station 904; and sending a delivery instruction to the delivery terminal 906 after the target cooking station 904 finishes cooking and fills a cooked dish into the dish container. The target cooking station 904 is configured for performing a cooking process for the to-be-cooked dish. The delivery terminal 906 is configured for performing a dish delivery task based on the delivery instruction.

The interactive control system for the intelligent kitchen may further include a user terminal, which is configured for sending a dish order to the interactive control apparatus, wherein the dish order includes the dish information of the to-be-cooked dish.

The user terminal may first display an ordering menu for the user to order. Then, based on the user's ordering instructions, the user terminal determines a total cost of the dishes chosen by the user and displays an order payment interface. Next, the user terminal determines the dish order and displays a dish order interface.

The interactive control apparatus 902 may display a dish process management interface. Herein, the dish process management interface may include the dish information, the dish order information, a manual switch button, a dish cooking sequence, etc. The interactive control apparatus 902 may also feed back to the user terminal a progress state of the dish order of the to-be-cooked dish, so that the user can check the progress state of the dish order and manage the dish order at the user terminal.

It should be noted that, after the target cooking station 904 feeds back the cooking-finished information of the to-be-cooked dish, the interactive control apparatus 902 may also match the dish container filled with the cooked dish on the target cooking station 904 with the delivery terminal 906.

After the delivery terminal 906 finishes the dish delivery task, it may feed back to the interactive control apparatus 902 a delivery-finished instruction, so that the interactive control apparatus 902 controls the delivery terminal 906 to return to a delivery waiting position in the intelligent kitchen.

Further, in an exemplary embodiment of the present disclosure, an interactive control apparatus for an intelligent kitchen is also provided.

Figure 10:
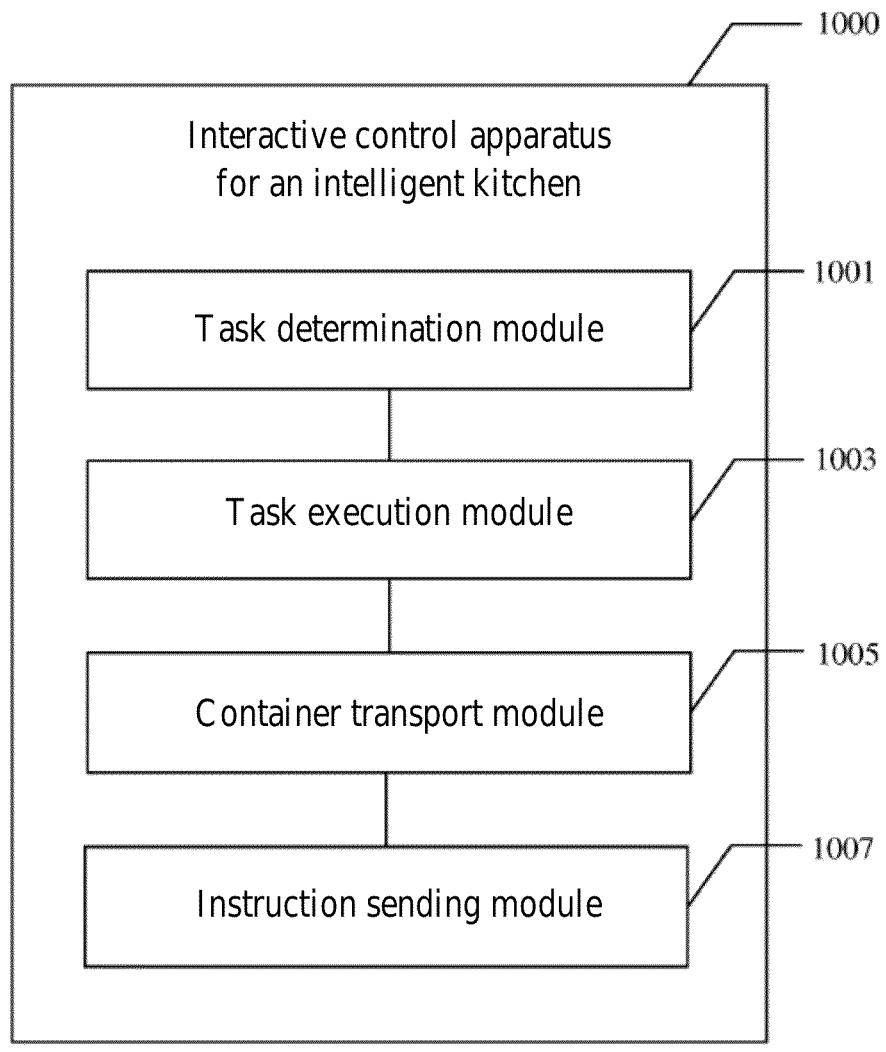
FIG. 10 schematically shows a block diagram of an interactive control apparatus for an intelligent kitchen according to an exemplary embodiment of the present disclosure.

FIG. 10 schematically shows a block diagram of an interactive control apparatus for an intelligent kitchen according to an exemplary embodiment of the present disclosure. Referring to FIG. 10, the interactive control apparatus 1000 for the intelligent kitchen according to the exemplary embodiment of the present disclosure may include a task determination module 1001, a task execution module 1003, a container transport module 1005 and an instruction sending module 1007.

Among which, the task determination module 1001 is configured for obtaining dish information of a to-be-cooked dish, and determining a cooking task according to the dish information. The task execution module 1003 is configured for controlling, according to the cooking task, a target cooking station to cook the to-be-cooked dish. The container transport module 1005 is configured for determining, according to the dish information, a dish container corresponding to the dish information, and controlling the dish container to be transported to a dish receiving position of the target cooking station. The instruction sending module 1007 is configured for sending a delivery instruction after the target cooking station finishes cooking and fills cooked dish into the dish container, to control a delivery terminal to perform a dish delivery task.

According to another embodiment of the present disclosure, when the cooking task includes cooking multiple to-be-cooked dishes at the same time, the interactive control apparatus for the intelligent kitchen, compared with the interactive control apparatus 1000 for the intelligent kitchen, may further include a serving determination module and an operation control module.

Among which, the servings determination module may be configured for determining the number of cooking servings of the to-be-cooked dish. The operation control module may be configured for controlling the target cooking station to perform a first lighting operation, in a case where the number of the dish containers for the to-be-cooked dish placed at the dish receiving position of the target cooking station is less than the number of cooking servings, to remind the staff to add dish containers for the to-be-cooked dish.

According to another embodiment of the present disclosure, the interactive control apparatus for the intelligent kitchen, compared with the interactive control apparatus

1000 for the intelligent kitchen, may further include a number determination module and a number comparison module.

Among which, the number determination module may be configured for determining number of the dish container corresponding to the dish information contained in the intelligent kitchen. The number comparison module may be configured for controlling the target cooking station to perform an alarm operation, in response to the number of the dish container corresponding to the dish information being less than a preset value, so that the staff can add dish containers corresponding to the dish information.

According to another embodiment of the present disclosure, when the target cooking station is cooking the to-be-cooked dish, the interactive control apparatus for the intelligent kitchen, compared with the interactive control apparatus 1000 for the intelligent kitchen, may further include a position determination module, which may be configured for controlling the target cooking station to perform a second light-on operation, in response to no dish containers for the to-be-cooked dish being placed at the dish receiving position of the target cooking station, so as to remind the staff to place dish containers for the to-be-cooked dish.

Figure 11:
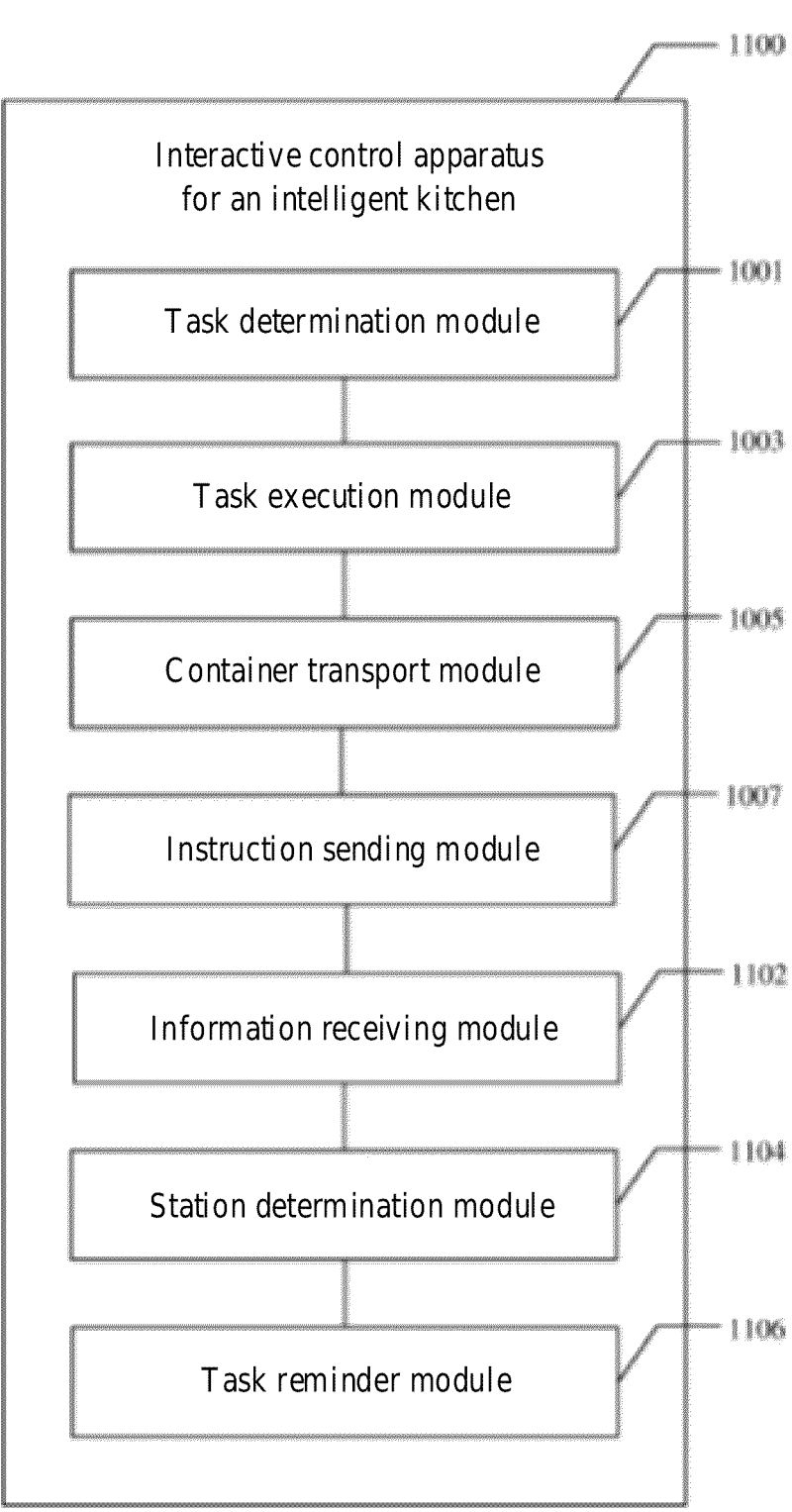
FIG. 11 schematically shows a block diagram of an interactive control apparatus for an intelligent kitchen according to another exemplary embodiment of the present disclosure.

According to another embodiment of the present disclosure, the intelligent kitchen includes a plurality of cooking stations other than the target cooking station, and the interactive control apparatus 1100 for the intelligent kitchen, compared with the interactive control apparatus 1000 for the intelligent kitchen, may also include an information receiving module 1102, a station determination module 1104 and a task reminder module 1106, referring to FIG. 11.

Among which, the information receiving module 1102 is configured for receiving order reminder information for the target dish. The station determination module 1104 is configured for determining the cooking station corresponding to the target dish as a cooking station with a delivery priority, in response to multiple to-be-cooked dishes corresponding to the plurality of cooking stations including the target dish. The task reminder module 1106 is configured for controlling the cooking station with the delivery priority to perform a third light-on operation, in response to the plurality of cooking stations finishing cooking at the same time, to remind the staff to complete a dish delivery task.

Figure 12:
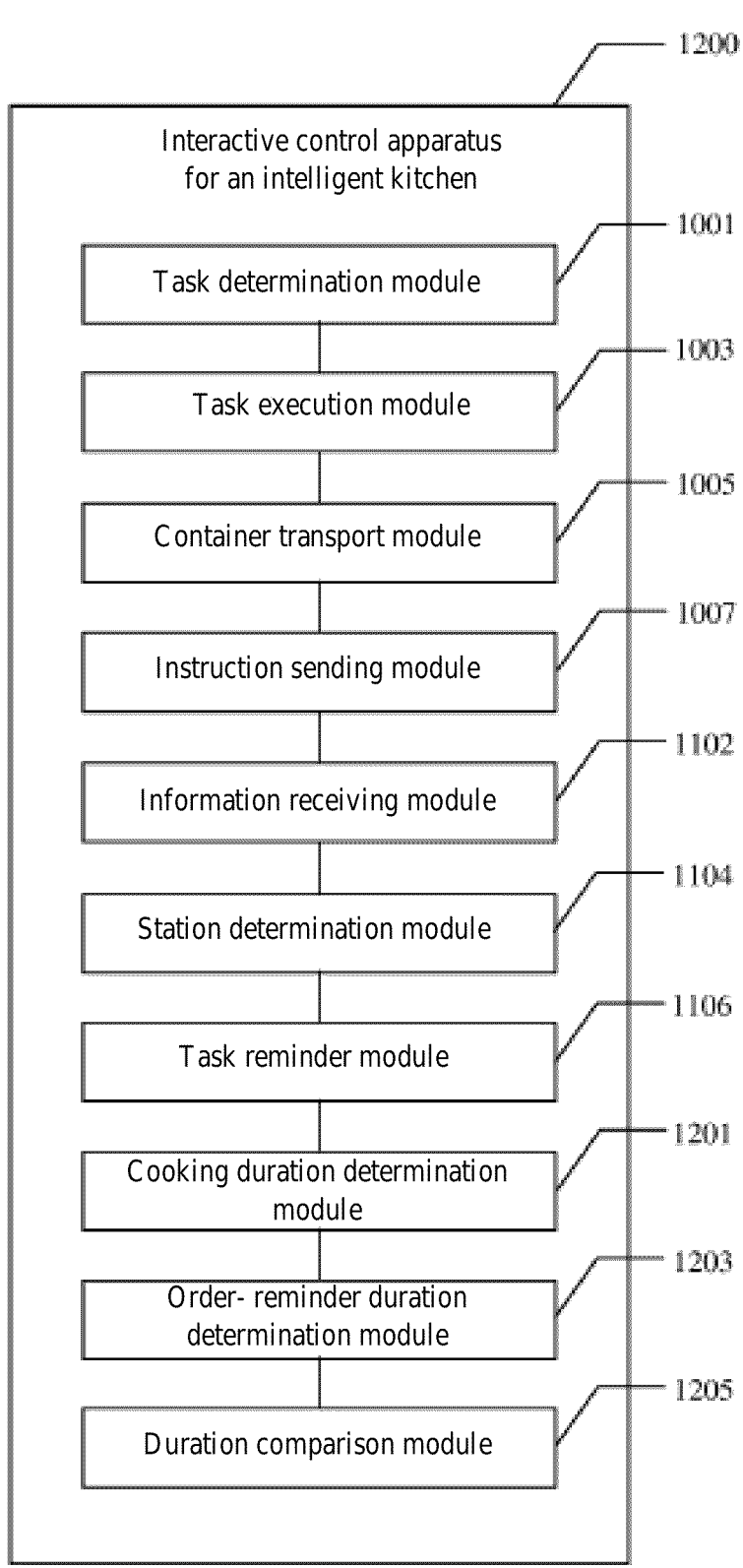
FIG. 12 schematically shows a block diagram of an interactive control apparatus for an intelligent kitchen according to another exemplary embodiment of the present disclosure.

According to another embodiment of the present disclosure, referring to FIG. 12, the interactive control apparatus 1200 for the intelligent kitchen, compared with the interactive control apparatus 1100 for the intelligent kitchen, may further include a cooking duration determination module 1201, an order-reminder duration determination module 1203, and a duration comparison module 1205.

Among which, the cooking duration determination module 1201 is configured for determining waiting duration for cooking the target dish, in a case where multiple to-be-cooked dishes corresponding to the plurality of cooking stations do not include the target dish. The order-reminder duration determination module 1203 is configured for determining the order-reminder waiting duration of the target dish based on the order reminder information. The duration comparison module 1205 is configured for sending a manual cooking reminder, in response to the waiting duration for cooking the target dish being longer than the order-reminder waiting duration of the target dish, so that the target dish can be cooked by the staff.

According to another embodiment of the present disclosure, the cooking duration determination module 1201 may be further configured for obtaining remaining cooking durations respectively corresponding to the plurality of cooking stations, and determining the shortest cooking duration from the remaining cooking durations, as the waiting duration for cooking the target dish.

According to another embodiment of the present disclosure, before the target cooking station receives the cooking task, the task execution module 1003 may be further configured for: determining, in response to task modification information for the cooking task being obtained, modified cooking task based on the task modification information, and controlling, according to the modified cooking task, the target cooking station to cook the to-be-cooked dish.

According to another embodiment of the present disclosure, the task determination module 1001 may further include an order obtaining unit, which may be configured for obtaining a dish order, and determining the dish information of the to-be-cooked dish based on the dish order.

According to another embodiment of the present disclosure, the dish container includes an RFID (Radio Frequency Identification) tag. After the cooked dish is filled into the dish container, the interactive control apparatus for the intelligent kitchen, compared with the interactive control apparatus 1000 for the intelligent kitchen, further includes an information determination module and an information writing module. The information determination module can be configured for determining the dish delivery information of the cooked dish. The information writing module can be configured for sending the dish delivery information to an information writing terminal, and controlling the dish container filled with the cooked dish to be transported to the information writing end, so that the information writing end can write the dish delivery information into the RFID tag.

The specific details of each module/unit in above-mentioned apparatus have been described in detail in the method embodiments, and thus are not repeated here.

In an exemplary embodiment of the present disclosure, there is also provided a computer-readable storage medium which has a program product capable of implementing above-mentioned method of the present disclosure stored thereon. In some possible implementations, various aspects of the present disclosure can also be implemented in the form of a program product, which includes program codes, and when the program product runs on a terminal device, the program codes cause the terminal device to execute steps according to various exemplary embodiments of the present disclosure that are described in the "example methods" section in this specification.

In an exemplary embodiment of the present disclosure, there is also provided an electronic device capable of implementing above method.

As will be appreciated by those skilled in the art, various aspects of the present disclosure may be implemented as a system, a method or a program product. Therefore, various aspects of the present disclosure can be embodied in the following forms, namely a complete hardware implementation, a complete software implementation (including firmware, microcode, etc.), or a combination implementation of hardware and software, which may be collectively referred to herein as "circuit", "module" or "system".

An electronic device 1300 according to an embodiment of the present disclosure is described below with reference to FIG. 13. The electronic device 1300 shown in FIG. 13 is only an example, and should not impose any restrictions on the function and use scope of the embodiments of the present disclosure.

Figure 13:
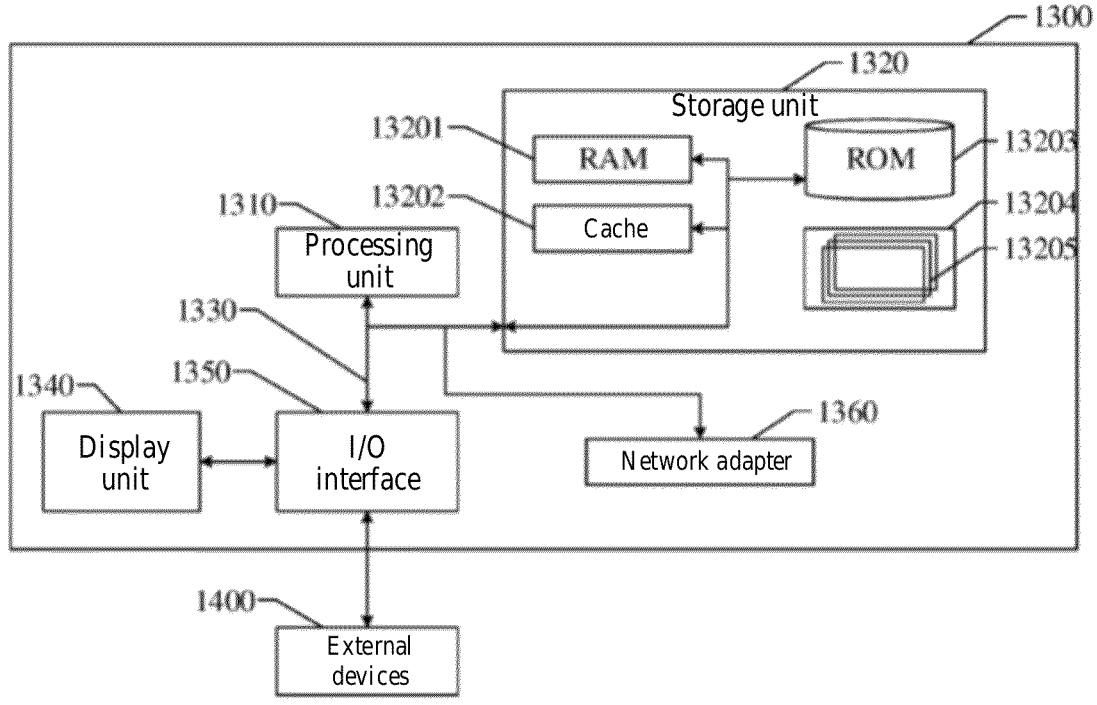
FIG. 13 schematically shows a block diagram of an electronic device according to an exemplary embodiment of the present disclosure.

As shown in FIG. 13, electronic device 1300 is embodied in the form of a general-purpose computing device. Components of the electronic device 1300 may include, but not limited to above at least one processing unit 1310, above at least one storage unit 1320, a bus 1330 connecting different system components (including the storage unit 1320 and the processing unit 1310), and a display unit 1340.

The storage unit stores program codes, and the program codes can be executed by the processing unit 1310, so that the processing unit 1310 executes steps according to various exemplary embodiments of the present disclosure that are described in the "example methods" section in this specification. For example, the processing unit 1310 may execute steps S102 to S108 as shown in FIG. 1.

The storage unit 1320 may include a readable medium in the form of a volatile storage unit, such as a random access storage unit (RAM) 13201 and/or a cache storage unit 13202, and may further include a read only storage unit (ROM) 13203.

The storage unit 1320 may further include a program/utility 13204 having a set of (at least one) program modules 13205, and such program modules 13205 includes but not limited to an operating system, one or more application programs, other program modules, and program data. Each or some combination of these examples may include an implementation of a network environment.

The bus 1330 may be representative of one or more of several types of bus structures, including a memory cell bus or a memory cell controller, a peripheral bus, a graphics acceleration port, a processing unit, or a local area bus using any of a variety of bus structures.

The electronic device 1300 may also communicate with one or more external devices 1400 (e.g., keyboards, pointing devices, Bluetooth devices, etc.), as well as with one or more devices that enable a user to communicate with the electronic device 1300, and/or communicate with any device (e.g., router, modem, etc.) that enables the electronic device 1300 can communicate with one or more other computing devices. Such communication may be conducted through input/output (I/O) interface 1350. Also, the electronic device 1300 may communicate with one or more networks (e.g., a local area network (LAN), a wide area network (WAN), and/or a public network such as the Internet) through a network adapter 1360. As is shown, the network adapter 1360 communicates with other modules of electronic device 1300 via bus 1330. It should be understood that, although not shown, other hardware and/or software modules may be used in conjunction with electronic device 1300, including but not limited to microcodes, device drivers, redundant processing units, external disk drive arrays, RAID systems, tape drivers, data backup storage systems, etc.

From the descriptions of the above embodiments, it can be easily understood for those skilled in the art that the exemplary embodiments described herein may be implemented by software, or by a combination of software and necessary hardware. Therefore, the technical solutions according to the embodiments of the present disclosure may be embodied in the form of software products. The software products may be stored in a non-volatile storage medium (which may be CD-ROM, U disk, mobile hard disk, etc.) or on the network, including several instructions to cause a computing device (which may be a personal computer, a server, a mobile terminal, or a network device, etc.) to implement the method according to the embodiments of the present disclosure.

Furthermore, the above-mentioned figures are merely schematic illustrations of the processes included in the methods according to the exemplary embodiments of the present disclosure, and are not intended to restrict. It is easy to understand that the processes shown in the above figures do not indicate or restrict the chronological order of these processes. In addition, it is also readily understood that these processes may be executed synchronously or asynchronously, for example, in multiple modules.

It should be noted that although several modules or units of the apparatus for perform actions are mentioned in the above detailed descriptions, such division is not mandatory. Indeed, according to embodiments of the present disclosure, the features and functions of two or more modules or units described above may be embodied in one module or unit. Conversely, the features and functions of one module or unit described above may be further divided into multiple modules or units to be embodied.

Other embodiments of the present disclosure will be easily conceivable to those skilled in the art upon consideration of the specification and practice of the invention disclosed herein. The present disclosure is intended to cover any variations, uses, or adaptations of the present disclosure that follow the general principles of the present disclosure and include common knowledge or conventional technical means in the art which are not disclosed by the present disclosure. The specification and examples are to be regarded as exemplary only, and the true scope and spirit of the present disclosure are indicated by the appended claims.

It should be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. An interactive control method for an intelligent kitchen, configured for scheduling cooking and delivery related to the order reminder information in the intelligent kitchen, comprising:

obtaining dish information of a to-be-cooked dish, and determining a cooking task according to the dish information;

controlling, according to the cooking task, a target cooking station to cook the to-be-cooked dish;

determining, according to the dish information, a dish container corresponding to the dish information, and controlling the dish container to be transported to a dish receiving position of the target cooking station; and sending a delivery instruction after the target cooking station finishes cooking and fills a cooked dish into the dish container, to control a delivery terminal to perform a dish delivery task;

wherein the intelligent kitchen comprises a plurality of cooking stations other than the target cooking station, and the interactive control method further comprises:

receiving order reminder information for a target dish;

in response to the target dish being contained in multiple to-be-cooked dishes corresponding to the plurality of cooking stations, determining a cooking station corresponding to the target dish as a cooking station with a delivery priority;

in response to the plurality of cooking stations finishing cooking at the same time, controlling the cooking station with the delivery priority to perform a third light-on operation, wherein the third light-on operation is used to remind a staff to complete the dish delivery task;

in response to the target dish being not contained in the multiple to-be-cooked dishes corresponding to the plurality of cooking stations, obtaining remaining cooking durations respectively corresponding to the plurality of cooking stations, and determining shortest cooking duration from the remaining cooking durations as the waiting duration for cooking the target dish;

determining order-reminder waiting duration of the target dish based on the order reminder information;

in response to the waiting duration for cooking the target dish being longer than the order-reminder waiting duration of the target dish, sending a manual cooking reminder, wherein the manual cooking reminder is used to remind the staff to cook the target dish; and scheduling the cooking and delivery related to the order reminder information based on at least one of the delivery priority, the third light-on operation, or the manual cooking reminder.

2. The interactive control method for the intelligent kitchen according to claim 1, further comprising:

determining number of cooking servings of the to-be-cooked dish; and in response to number of the dish container for the to-be-cooked dish placed at the dish receiving position being less than the number of cooking servings, controlling the target cooking station to perform a first light-on operation, wherein the first light-on operation is used to remind a staff to add the dish container for the to-be-cooked dish.

3. The interactive control method for the intelligent kitchen according to claim 1, further comprising:

determining number of the dish container corresponding to the dish information contained in the intelligent kitchen; and in response to the number of the dish container corresponding to the dish information being less than a preset container threshold, controlling the target cooking station to perform an alarm operation, wherein the alarm operation is used to remind a staff to add the dish container corresponding to the dish information.

4. The interactive control method for the intelligent kitchen according to claim 1, further comprising:

in response to no dish container for the to-be-cooked dish being placed at the dish receiving position of the target cooking station, controlling the target cooking station to perform a second light-on operation, wherein the second light-on operation is used to remind a staff to place the dish container for the to-be-cooked dish.

5. The interactive control method for the intelligent kitchen according to claim 1, wherein controlling, according to the cooking task, the target cooking station to cook the to-be-cooked dish comprises:

in response to task modification information for the cooking task being obtained, determining a modified cooking task based on the task modification information; and controlling, according to the modified cooking task, the target cooking station to cook the to-be-cooked dish.

6. The interactive control method for the intelligent kitchen according to claim 1, wherein obtaining the dish information of the to-be-cooked dish comprises:

obtaining a dish order, and determining the dish information of the to-be-cooked dish based on the dish order.

7. The interactive control method for the intelligent kitchen according to claim 1, wherein the dish container comprises a radio frequency identification tag, and the interactive control method for the intelligent kitchen further comprises:

determining dish delivery information of the cooked dish; and sending the dish delivery information to an information writing end, and controlling the dish container filled with the cooked dish to be transported to the information writing end, wherein the information writing end is configured to write the dish delivery information into the radio frequency identification tag.

8. An interactive control system for an intelligent kitchen, configured for scheduling cooking and delivery related to the order reminder information in the intelligent kitchen, comprising an interactive control apparatus, a target cooking station and a delivery terminal, wherein the interactive control apparatus is configured to obtain dish information of a to-be-cooked dish; determine a cooking task according to the dish information; control, according to the cooking task, the target cooking station to cook the to-be-cooked dish; determine, according to the dish information, a dish container corresponding to the dish information; control the dish container to be transported to a dish receiving position of the target cooking station; and send a delivery instruction after the target cooking station finishes cooking and fills a cooked dish into the dish container, to control the delivery terminal to perform a dish delivery task;

wherein the intelligent kitchen comprises a plurality of cooking stations other than the target cooking station, and the interactive control apparatus is further configured to receive order reminder information for a target dish; determine, in response to the target dish being contained in multiple to-be-cooked dishes corresponding to the plurality of cooking stations, a cooking station corresponding to the target dish as a cooking station with a delivery priority; control, in response to the plurality of cooking stations finishing cooking at the same time, the cooking station with the delivery priority to perform a third light-on operation, wherein the third light-on operation is used to remind a staff to complete the dish delivery task; obtain, in response to the target dish being not contained in the multiple to-be-cooked dishes corresponding to the plurality of cooking stations, remaining cooking durations respectively corresponding to the plurality of cooking stations; determine the shortest cooking duration from the remaining cooking durations, as the waiting duration for cooking the target dish; determine order-reminder waiting duration of the target dish based on the order reminder information; and send a manual cooking reminder in response to the waiting duration for cooking the target dish being longer than the waiting duration for the order reminder of the target dish, wherein the manual cooking reminder is used to remind the staff to cook the target dish;

the target cooking station is controlled to perform cooking of the to-be-cooked dish;

the delivery terminal is configured to perform the dish delivery task based on the delivery instruction; and indication lights with different colors, wherein the different colors are used to indicate different operations;

wherein the cooking and delivery related to the order reminder information are scheduled based on at least one of the delivery priority, the third light-on operation, or the manual cooking reminder.

9. The interactive control system for the intelligent kitchen according to claim 8, wherein the interactive control system for the intelligent kitchen further comprises:

a user terminal configured to send a dish order to the interactive control apparatus, wherein the dish order comprises the dish information of the to-be-cooked dish.

10. A non-transitory computer-readable storage medium having a computer program stored thereon, which when executed by a processor, the interactive control method for the intelligent kitchen according to claim 1 is implemented.

11. An electronic device, comprising:

one or more processors; and a storage device configured to store one or more programs, which when executed by the one or more processors, cause the one or more processors to implement the interactive control method for the intelligent kitchen according to claim 1.

12. The interactive control system for the intelligent kitchen according to claim 8, wherein the interactive control apparatus is further configured to determine number of cooking servings of the to-be-cooked dish; and the target cooking station is further controlled to perform a first light-on operation in response to number of the dish container for the to-be-cooked dish placed at the dish receiving position being less than the number of cooking servings, wherein the first light-on operation is used to remind a staff to add the dish container for the to-be-cooked dish.

13. The interactive control system for the intelligent kitchen according to claim 8, wherein the interactive control apparatus is further configured to determine number of the dish container corresponding to the dish information contained in the intelligent kitchen; and the target cooking station is further controlled to perform an alarm operation in response to the number of the dish container corresponding to the dish information being less than a preset container threshold, wherein the alarm operation is used to remind a staff to add the dish container corresponding to the dish information.

14. The interactive control system for the intelligent kitchen according to claim 8, wherein the target cooking station is further controlled to perform a second light-on operation in response to no dish container for the to-be-cooked dish being placed at the dish receiving position of the target cooking station, wherein the second light-on operation is used to remind a staff to place the dish container for the to-be-cooked dish.

15. The interactive control system for the intelligent kitchen according to claim 8, wherein the interactive control apparatus is further configured to determine a modified cooking task based on the task modification information in response to task modification information for the cooking task being obtained, and the target cooking station is further controlled to cook the to-be-cooked dish according to the modified cooking task.

16. The interactive control system for the intelligent kitchen according to claim 8, wherein the interactive control apparatus is further configured to obtain a dish order, and determine the dish information of the to-be-cooked dish based on the dish order.

17. The interactive control system for the intelligent kitchen according to claim 8, wherein the interactive control system for the intelligent kitchen further comprises an information writing end, and the dish container comprises a radio frequency identification tag, and wherein the interactive control apparatus is further configured to determine dish delivery information of the cooked dish, send the dish delivery information to the information writing end, and control the dish container filled with the cooked dish to be transported to the information writing end, wherein the information writing end is configured to write the dish delivery information into the radio frequency identification tag.

* * * * *